United States Patent [19]

Gee

[11] 4,162,830
[45] Jul. 31, 1979

[54] VIDEO PHOTOGRAPHIC SYSTEM

[75] Inventor: Alan E. Gee, Sunnyvale, Calif.

[73] Assignee: American Optical Corporation, Southbridge, Mass.

[21] Appl. No.: 785,391

[22] Filed: Apr. 7, 1977

[51] Int. Cl.² .............. G01D 9/42; G03B 27/76; G01J 1/44
[52] U.S. Cl. .................... 354/23 R; 354/76; 346/110 R; 355/20; 356/226
[58] Field of Search ........... 354/23 R, 53, 57, 60 E, 354/61, 289, 60 R, 50, 51, 48, 79, 22, 76; 355/38, 68, 69, 20; 356/223, 226–228; 250/311, 205, 549; 350/17, 19; 315/10, 30; 358/4, 168; 346/110 R

[56] References Cited

U.S. PATENT DOCUMENTS

| Re. 28,153 | 9/1974 | Coates et al. | 250/311 |
|---|---|---|---|
| 2,472,381 | 6/1949 | McMaster | 356/228 |
| 3,130,634 | 4/1964 | Kropp et al. | 355/68 |
| 3,523,740 | 8/1970 | Peter et al. | 356/226 |
| 3,564,330 | 2/1971 | Pfeiffer | 315/10 |
| 3,649,755 | 3/1972 | Newman | 315/10 |
| 3,696,720 | 10/1972 | Vinson | 250/549 |
| 3,795,836 | 3/1974 | Nilsson | 346/110 R X |
| 3,987,463 | 10/1976 | Nishikawa et al. | 354/79 |
| 4,023,910 | 5/1977 | Niederhauser et al. | 356/227 |
| 4,025,190 | 5/1977 | Hughes | 356/226 X |

FOREIGN PATENT DOCUMENTS

| 235141 | 12/1963 | Austria | 350/19 |
|---|---|---|---|
| 1163135 | 12/1964 | Fed. Rep. of Germany | 354/23 R |

Primary Examiner—L. T. Hix
Assistant Examiner—William B. Perkey
Attorney, Agent, or Firm—Jeremiah J. Duggan; Alan H. Spencer; Stephen A. Schneeberger

[57] ABSTRACT

Photometer means usable in scientific instrument having a video display means such as a scanning electron microscope including means for matching the intensity of the video display to the exposure time selected for photographing said video display taking into consideration such film characteristics as film speed, reciprocity failure and exposure time.

5 Claims, 3 Drawing Figures

VIDEO PHOTOGRAPHIC SYSTEM

BACKGROUND OF THE INVENTION

The present invention relates to photometer means as adapted to a photographic system for a video display including compensation for reciprocity failure characteristics of the film as well as film speed.

Exposure controls which are correlated to various parameters of photographic film and the amount of light flux incident thereon are well known. Such systems are often exposure controls of the capacitance type in which a capacitor is charged at a rate proportional to the illumination to which the film is subject, for example, by exposing a photocell to the same illumination. The charge on the capacitor is the time integral of the current in the capacitor and analogously the film exposure is the time integral of light flux incident on the film. Therefore, the capacitor integrates current with respect to time as the photographic film integrates incident light flux with respect to time. Thus, at a given predetermined level of voltage on a capacitor, representative of the predetermined desired integral of light flux, the camera shutter may be closed.

In such an arrangement, the speed of the film (ASA) is an analog of the capacitance, that is a capacitance having a given charge rate is used in conjunction with a given ASA film having a given rate at which it becomes light saturated. Additionally, some prior exposure controls take into account reciprocity failure characteristic of film. Reciprocity failure is a property of photographic emulsion by which its light sensitivity decays during time of exposure. That is to say the curve of sensitivity versus exposure time is nonlinear. For long exposure times as are typical, for example, in photomicrography of the type presently illustrated, this change in characteristic becomes significant.

In those instances where photomicrography is done on a scanning electron microscope wherein the photograph taken is of video display, procedures taken to photograph vary somewhat from those followed in other photomicrography.

In the instance of scanning electron microscopy, one normally predetermines the exposure time which he desires to use in generating a photomicrograph. This determination of exposure time is usually dependent upon such things as the characteristics of specimen charging, specimen motion, or other characteristics which are peculiar to photomicrographs prepared in scanning electron microscopy.

It may be thus noted that rather than exposure time being calculated as in the conventional sense based upon light flux incident on the film, the reverse procedure is actually followed. One must then follow procedures to match the light flux incident upon the film to the chosen exposure time. In conjunction with such matchings, one must give significant consideration to the characteristic of reciprocity failure in that photo exposure times in certain SEM photomicrography are substantial. These times may amount to 60 or more seconds per photograph.

Reciprocity failure is of concern for photomicrographs which are prepared from multiple rasters of low brightness which are integrated by the photographic film over a relatively long exposure time. See, for example, the multiple interlace system referred to in U.S. Pat. No. Re. 28,153 assigned to the Assignee of the present application. Single scan raster photography (such as is used by most of the conventional SEM's) does not suffer the problem even though the total exposure time may be the same. In these single scan systems, the illuminating spot traversing the film passes each spot (transits the raster) only once so the film exposure, considered on a spot-by-spot basis, occurs only once over a very short period of time and thus not generating the reciprocity problem.

With the exception of reciprocity failure and gamma (which is not involved in the calculations of the present invention) photography can be considered a linear process. However, by custom, and for practical considerations (ease of computation of parameters) most of the factors involved in photography are presented in multiples of two (e.g. in binary function). For example, typical camera shutter speeds are approximately multiples of two (e.g. notations of: 1, 2, 5, 10, 25, 50, 100, 250, 500 and 1,000 indication fractions of seconds). Likewise, camera F-stops although not always so marked, are factors of two in amount of flux reaching the film (e.g. notations of: 2; 2.8; 4; 5.6; 8; 11; 16; 22; and 32.).

With the present improvements while making the control functions for the scientific instrument more convenient and usable to the operator, one observes a collateral benefit of being able to use less expensive linear devices in such as meters as opposed to more highly sensitive or sophisticated logarithmic instruments.

SUMMARY OF THE INVENTION

It is thus an object of the present invention to provide control apparatus for a viedo-photographic system for coordinating variables in such systems such as exposure time, film reciprocity and illumination to the film characteristics. In the present system, a photodetector such as a photoresistive or a photoconductive cell is disposed in the video-photography system such as to be subject to the same illumination as the film upon which micrograph will be generated. The system further includes voltmeter means for recording the output across the photodetector, such voltage being generated in direct response to the illumination upon the photodetector. The system further includes nonlinear voltage divider means including first resistor in series with diode means and a second resistor. The first resistor being interposed in series between the photocell and the voltmeter means and the diode means with the second resistor being disposed in parallel with the voltmeter means. Said first and second resistors are selected to provide a binary relationship with said voltmeter means such that about ¼ of full scale voltage on the non linear divider means provides substantially mid-scale reading on the voltmeter means. Also included is a variable, nonlinear voltage divider means connected to the photocell. The nonlinearity of such voltage divider is selected to have a predetermined relationship with the reciprocity failure rate of the film being used in the system. In this conjunction, this nonlinear voltage divider means is preferably chosen to be a step function device and each one of the steps representing one of the predetermined available exposure times for generating photomicrographs in the video photographic system.

The general discussion herein contemplates utilization of a photo resistive cell as the detector. However, the embodiment illustrated includes a photoconductive cell as the detector means. In such device the voltage developed across the cell is inversely proportional to the light flux. In such case, the circuit requires an inverting amplifier connected to the output of the photoconductive cell to provide for proper summation of the signals generated. The selection of one of the other of these types of photocells may be a matter of design choice depending upon the number and type of other subsequently described circuit features to be included in the operative device.

Preferred embodiments include additional compensating means to accommodate for such as film speed wherein one or more of a variety of films may be used in the system. In such fashion, step function is normally included in conjunction with amplitude control varying means, the relationship of which amplitude control means is directly related to the film speeds and thus the brightness required in illuminating the film to prepare the photomicrograph.

In further embodiments where there may be substantial variation in different films, reciprocity failure rates, multiple nonlinear voltage divider means may be utilized to provide accurate compensation for such reciprocity failure for each film type utilized in the photographic system.

DESCRIPTION OF A PREFERRED EMBODIMENT

Figure 1:
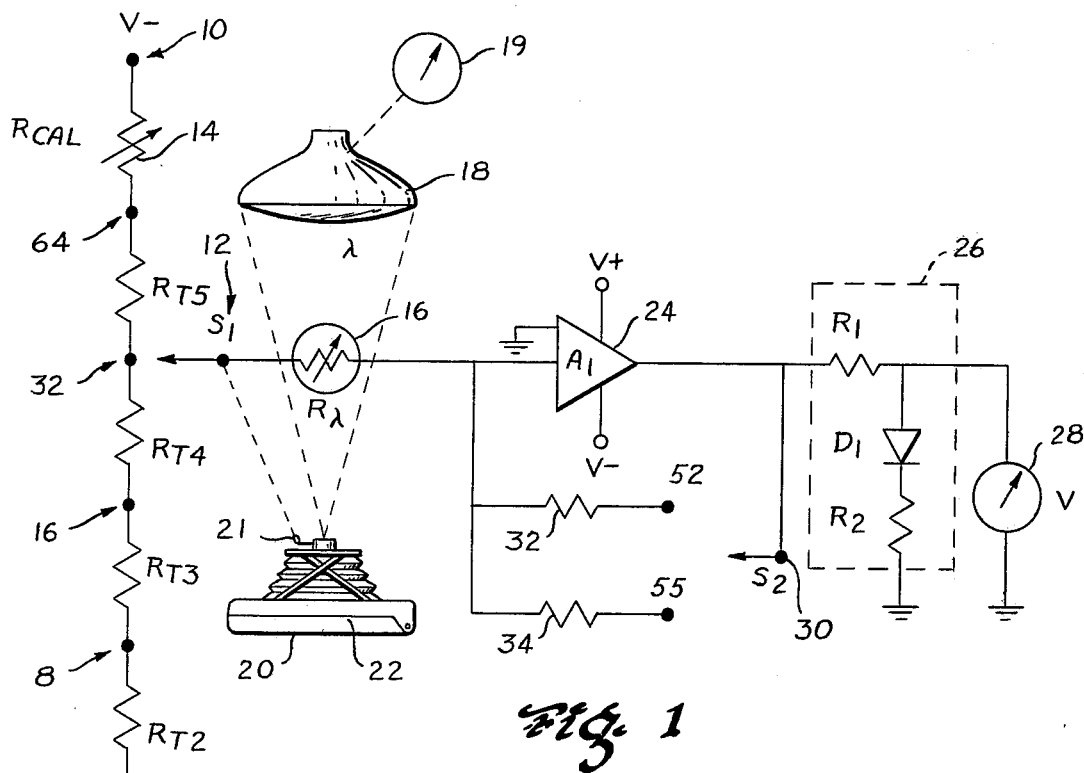
FIG. 1 is a schematic diagram illustrating the electrical philosophy embodied in the present invention.

Referring now to FIG. 1, the control of the present invention will be discussed in detail. A reference voltage source 10 is impressed across the exposure time control switch 12. This exposure time switch consists of a series of resistors $R_{t0}$-$R_{t5}$ which in the preferred embodiment accommodate for exposure times of binary series 4–64 seconds. Also included is a calibration resistor 14 to provide some fine control adjustment for the exposure control function. A substantial feature of the present invention is incorporated in this multiresistor step-function exposure control switch. In this present embodiment, the reciprocity failure rate compensation for the control circuit is included in this switch control 12. As will be pointed out in greater detail in subsequent description, the resistance value $R_{t0}$-$R_{t5}$ increased in value as the exposure times increase from 4 seconds through the 64 seconds chosen for the preferred embodiment. The variation of resistance is matched in the circuit according to the reciprocity failure rate characteristic of the films according to the time function of the exposure control 21 of camera 22 disposed to photograph the image appearing on cathode ray tube (CRT) 18.

The output of the exposure switch is supplied to the photocell 16 which is disposed so as to be illuminated by the video (CRT) tube 18. The pattern of illumination of the video tube 18 is such that it is illuminated with the same light which is supplied to camera means 20 including film 22 upon which the photomicrograph is to be made. The output of the photocell is further supplied in the preferred embodiment to an inverting amplifier A1 at 24, the output of which is further supplied to voltage divider means 26. Voltage divider means 26 includes resistors $R_1$ and $R_2$ and a diode $D_1$. In the preferred embodiments, the diode is a relatively standard nonlinear device being a small signal silicon diode. Voltage divider circuit 26 operates in conjunction with voltmeter 28, as a nonlinear illumination measuring device to coordinate the brightness of the CRT video tube 18 to the requirements of the film 22 according to the exposure time selected on switch 12. In connection with the nonlinear nature of the silicon small signal diode $D_1$ in divider 26, $R_1$ and $R_2$ provide the voltage division necessary such that a half-scale reading on meter 28 will be accomplished when ¼ of the otherwise full-scale voltage is applied to the divider 26. In this fashion, binary points on the meter are symmetrical with respect to the center or half-scale reading on the voltage meter. It should be appreciated that illumination is a linear function such that if illumination were recorded directly on the voltmeter, an impractical meter scale would be required. By utilizing the nonlinear divider circuit 26, the illumination can be converted to a binary function which may be, accordingly, more easily observed on the voltmeter, avoiding crowding on one half scale and spread on the other such that one may more easily and accurately adjust brightness control 19 operating in conjunction with the CRT video tube 18 to provide the requisite illumination for a chosen exposure time.

More specifically, the output of amplifier 24 is linear with illumination. If a meter having an uncorrected linear scale were used, the entire second half of the scale would only represent change in illumination by a factor of 2, (e.g. twice the voltage output on cell 16) and all other observable illumination values on meter 28 would be in the first half. It is desirable to use center scale as the usual set point, but to have an expanded range for illumination control such as the illustrated usable range of 4, both below and above the selected set point. The non-linear divider of the present invention provides that capability.

The attached graph shows what the divider actually does.

Amplifier A1 is included at 24 and includes second switch means 30 including selectable feedback resistors 32 and 34. In the illustrated embodiment, two types of film are traditionally used having different ASA numbers representing differing film speed characteristics. In this present embodiment, therefore, accommodation is made for these film speeds by this amplifier which is a DC amplifier whose inverting gain is determined by the resistance of the chosen feedback resistor 32 or 34 in conjunction with the resistance of the photocell. In the embodiment of a photographic system in an electron microscope, switch position 30 might be indicated with the ASA numbers such as 400 and 50. It should be recognized that in applications where a wide variety of film speeds would be required, the variable resistor might be chosen with appropriate film speeds selected at varying stages of the resistance. Likewise, other step function devices might be utilized in this respect.

Thus, it may be seen that in the present photometer, a relatively simple construction may be employed to very directly and completely meet the requirements of a video photographic system for producing micrographs from an electron microscope. It should be noted that all of the variables compensated for in the present system are completely and independently controlled in the other. In this context, the following observations are made: (1) the film speed (ASA) is linear with respect to the value of the feedback resistor; (2) as a light-measuring device the photometer device is as linear as the photocell which is chosen (in the present embodiment a CL702L device); (3) the photometer circuit permits reciprocity failure compensation to any degree of accuracy required by virtue of choosing the appropriate system function of resistors in the nonlinear relationship according to the reciprocity failure rate of the chosen film or films; (4) inexpensive linear meters such as a common voltmeter may be made to read symmetrically in binary over a chosen range such as 16:1 with very good accuracy.

By way of further explanation, the photoconductor cell 16 may be seen to be placed such as to be illuminated by the video or CRT screen which is to be photographed by camera 20. The resistance of this photoconductive cell is inversely proportional to illumination according to conventional devices. The DC amplifier 24 provides an inverting gain determined by the feedback resistor 32 or 34 in conjunction with the resistance supplied by the photoconductor cell according to illumination thereon such that the ASA reading or film speed of the film may be accommodated for the control. The time selection switch 12 is actually a nonlinear voltage divider providing an input reference voltage variable with respect to the time selected. The variable voltage supplied according to the time selected bears a direct linear relationship to the reciprocity failure rate of the film normally used in the system. The second nonlinear voltage divider, being that illustrated at reference number 26, provides the desired binary indicated on meter 28 to provide easy control by an operator of the entire system. In such fashion, the internal resistors $R_1$ and $R_2$ and the diode in the voltage divider 26 provide the nonlinear division of voltage as previously described such that half-scale indication of the meter is equivalent or occurs at a voltage of approximately $\frac{1}{4}$ of the full-scale voltage applied to the divider. In such fashion, the indication of binarily increasing voltage provides a linear reading on the meter such that illumination intensity changes may be directly and quickly made.

As previously pointed out in conventional exposure control systems, reference voltages on time select switches are linear with respect to time such that the photometer can be linear with respect to the time selected and the illumination. This is the preferred situation in typical photographic applications. However, in the case of electron microscope applications, the range of exposure times used is such that as to involve substantial errors due to the film reciprocity in the emulsions. By deliberately making this reference voltage of the time select switch nonlinear with respect to time, this reciprocity failure for any given film can be completely and directly compensated for.

Reciprocity failure may differ with different types of film. Accordingly, to compensate perfectly for different films, there would be required a switchable nonlinear voltage divider for each type of film. In the present embodiment, however, the reciprocity failure rate for the two films normally used are relatively close and accommodation is made in the present embodiment for only one reciprocity failure rate which provides a very close approximation for the two rates actually observed. The residual error is within the exposure latitude in the system.

Thus, it may be seen the typical application of this photometer in an electron microscope, the operator of the electron microscope who is taking the photomicrograph may select the desired exposure time, e.g., 16, 32 or 34 seconds or such and set the switch at that value. He may then set the ASA switch to the value for the particular film chosen, e.g. 400 or 50 in the present illustration. Then the operator only needs to increase or decrease the brightness setting for the CRT intensity at control 19 such that the meter 28 reads midscale. By this simple control, the operator is assured of a properly exposed photograph and that the illumination requirements for the film 22 are completely compensated for.

Figure 2:
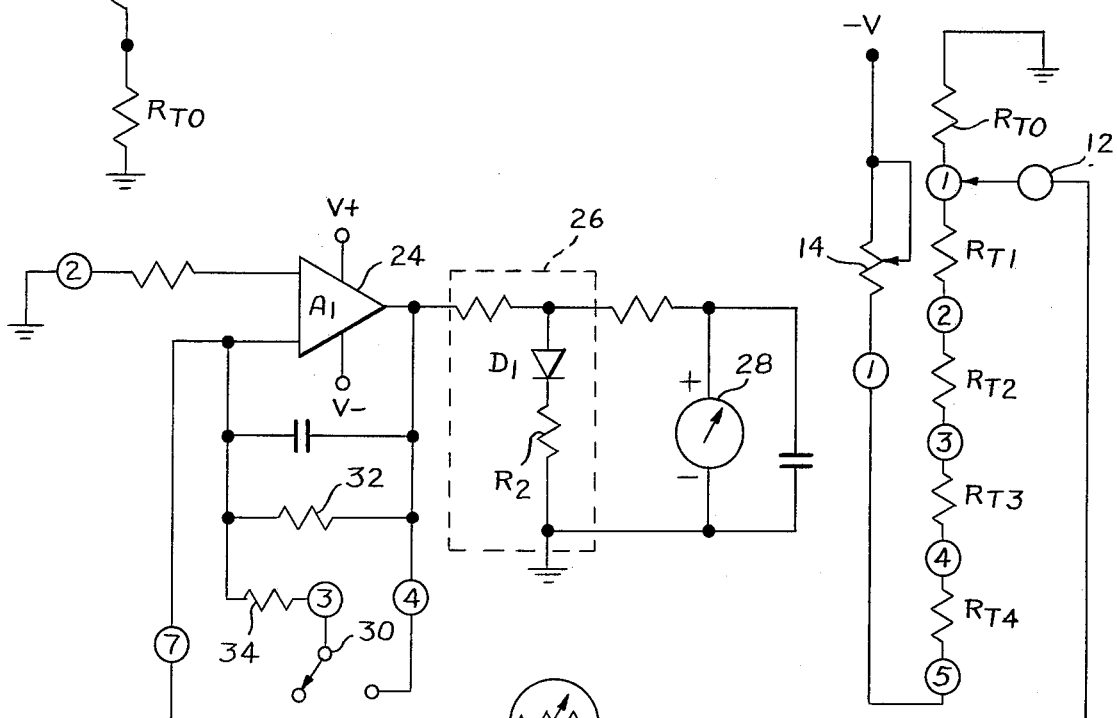
FIG. 2 is an electrical schematic of a preferred embodiment of the present invention described in detail in the subsequent sections.
Figure 3:
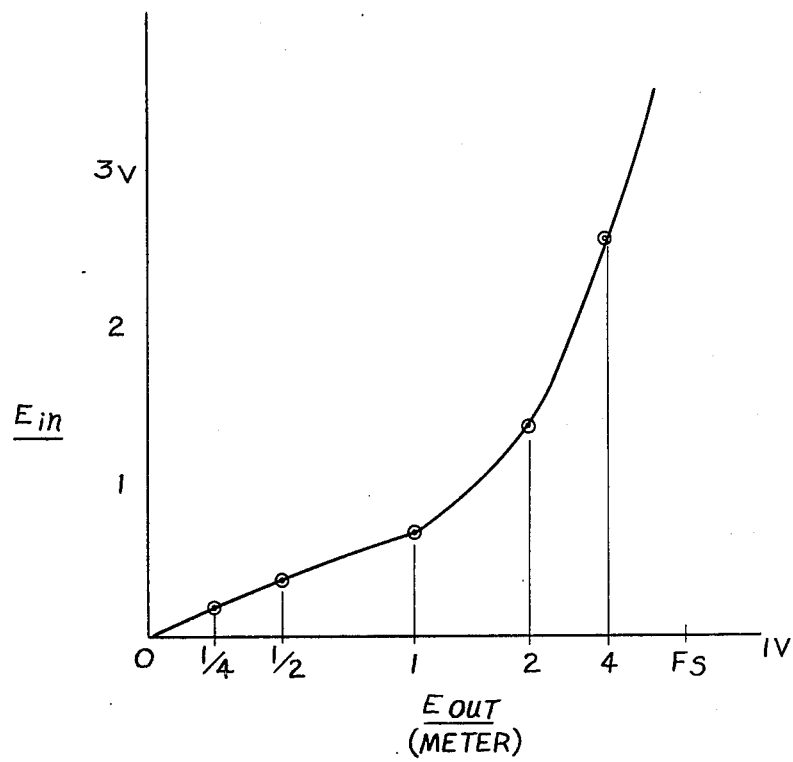
FIG. 3 is a graphical representation of the action of the binary voltage divider in the present invention.

Referring now to FIG. 2, a specific embodiment of the photometer circuit may be seen. In this instance, a single pole 5 throw switch 12 is connected through resistors $R_{t0}$ having a value of 200 ohms to the following schedule of resistors:

$R_{t1}$—120 ohms
$R_{t2}$—200 ohms
$R_{t3}$—390 ohms
$R_{t4}$+680 ohms

This nonlinear resistance variation provides a correction in the illustrated embodiment of seconds for the film of:

1 at selection 4
1.25 at selection 8
1.5 at selection 16
1.75 at selection 32
2 at time setting 64 A variable calibration resistor 14 is included being a 20 kilo ohm potiometer. This resistor is connected to the voltage source (V) which in the present embodiment is $-6.8$ volts. The output of switch 12 is supplied to the photoconductive cell which, as previously mentioned, is a CL702L. The output of this cell further supplied to the amplifier 24 being DC amplifier A1 type 1456. This amplifier is provided in the present embodiment with 6.8 volts of operating supply ± as indicated. The feedback resistors 32 and 34 are 2.2 megohms and includes a damping capacitor of 0.1 microfarads.

As may be noted here, the two 2.2 meg resistors provide only a change of 2 whereas ASA 400 to ASA 50 ratio suggests a change of 8 should be incorporated. In the present embodiment, the necessary brightness increase would be so high that the CRT would bloom and seriously degrade resolution. Therefore, an additional compensation is provided, such that the increased illumination on the film is provided not by a brighter CRT spot, but by a greater light admitting aperture in camera 20. The selector switch is coupled so that the operation changes the F:stop of the camera lens from F:11 at ASA400 to F5.6 at ASA 50. This increases camera speed by $(11/5.6)^2$ or the missing factor of 4.

This two stage accommodation for film speed represents a practical consideration in the illustrated system and is not a necessary element of the principle of the photometer of the present invention. If the resistor ratio were 8:1 (paralleled in this case) and the F:stop were left at F11, the photometer would indicate the correct brightness and no other control function necessary. This later basic embodiment would be usable for direct photography without a CRT system.

ASA selection switch 30 may be a single pole double throw switch. The second nonlinear voltage divider circuit includes $R_1$ of 560 ohms and $R_2$ of 56 ohms and diode $D_1$ a 1N914. Meter 28 is a 200 micro ampere meter which in the preferred embodiment includes a 3.3 kilo ohms in servies and 220 microfarads in parallel to provide the requisite match for the sensitivity required.

It should be thus apparent that a photographic exposure and illumination control has been described which is capable of compensating for the various parameters of film reciprocity failure, film speed, and the like.

It may occur to others of skill in the art to make the various modifications to this invention which will lie within the concept and scope thereof and not constitute departure therefrom. Accordingly, it is intended the invention be not limited by the details of this description but only by the appended claims.

I claim:

1. Control apparatus in a video-photographic system for coordinating variables such as exposure time, film reciprocity and illumination, to photograph film characteristic comprising: photodetector means disposed in said video-photography system and subject to the same illumination as the film in said system; voltmeter means for recording the voltage output of said photodetector means; non-linear voltage divider means including a first resistor in series with diode means and a second resistor, said first resistor being interposed in series between said photodetector means and said voltmeter means, and said voltmeter means and said diode means and second resistor being disposed in parallel with said voltmeter means, said first and second resistors and said diode being selected to provide a binary relationship with said voltmeter means such that about one-fourth full scale voltage on said diode means provides substantially a mid-scale reading on said voltmeter means; variable non-linear voltage divider means connected to said photodetector means, said variable non-linearity having a predetermined relationship to the reciprocity failure rate of photographic film used in said system.

2. Apparatus according to claim 1 including film speed compensating means including, DC amplifier means being interposed in series with said photodetector and said first resistor and having gain controlling variable feedback means, whereby, said feedback is applied in predetermined ratio to said film speed.

3. Apparatus according to claim 1 including a plurality of variable non-linear voltage divider means connected to said photocell, said plurality of divider means each having a predetermined relationship to the reciprocity failure rate of photographic film used in said system whereby a variety of photographic film reciprocity failure rates can be compensated for.

4. Apparatus according to claim 1 wherein said photodetector means is a photoresistive cell.

5. Apparatus according to claim 1 wherein said photodetector means is a photoconductive cell and includes voltage inverting amplifier means in series with said cell.

* * * * *